United States Patent
Baer et al.

(10) Patent No.: US 10,630,662 B1
(45) Date of Patent: **\*Apr. 21, 2020**

(54) KEY ROTATION WITH EXTERNAL WORKFLOWS

(71) Applicant: Amazon Technologies, Inc., Seattle, WA (US)

(72) Inventors: Graeme D. Baer, Seattle, WA (US); David M. Hulme, Seattle, WA (US); Benjamin E. Seidenberg, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/052,764

(22) Filed: Feb. 24, 2016

Related U.S. Application Data

(63) Continuation of application No. 14/563,891, filed on Dec. 8, 2014, now Pat. No. 9,276,754, which is a
(Continued)

(51) Int. Cl.
*H04L 29/06* (2006.01)
*G06F 21/00* (2013.01)
(Continued)

(52) U.S. Cl.
CPC .......... *H04L 63/062* (2013.01); *H04L 9/0825* (2013.01); *H04L 9/0891* (2013.01); *H04L 9/3268* (2013.01); *H04L 63/068* (2013.01)

(58) Field of Classification Search
CPC ... H04L 63/062; H04L 63/068; H04L 9/0825; H04L 9/0891; H04L 9/3268
See application file for complete search history.

(56) References Cited

U.S. PATENT DOCUMENTS

| 5,642,418 A | 6/1997 | Farris et al. |
| 5,970,475 A | 10/1999 | Barnes et al. |

(Continued)

FOREIGN PATENT DOCUMENTS

| JP | 2003152708 | 5/2003 |
| WO | 03100561 | 12/2003 |

(Continued)

OTHER PUBLICATIONS

Clara Bertolissi, Daniel Ricardo dos Santos, Silvio Ranise; "Automated Synthesis of Run-time Monitors to Enforce Authorization Policies in Business Processes"; Apr. 2015; ASIA CCS '15: Proceedings of the 10th ACM Symposium on Information, Computer and Communications Security; ACM; pp. 297-308 (Year: 2015).*
(Continued)

*Primary Examiner* — Shewaye Gelagay
*Assistant Examiner* — Courtney D Fields
(74) *Attorney, Agent, or Firm* — Kilpatrick Townsend & Stockton LLP

(57) ABSTRACT

A material set, such as an asymmetric keypair, is processed using an associated workflow to prepare the material set for activation and/or use. In one embodiment, a material set is generated and information about the material set is communicated to a workflow manager. Based at least on the information, the workflow manager generates a workflow that when accomplished will allow the material set to be activated and/or used. In another embodiment, a service provider provides a key manager, workflow manager and destination for the key, such as a load balancer that terminates SSL connections. A key can be generated by the key manager, sent through the workflow manager for processing (potentially communicated to third parties such as a certificate authority, if needed) and installed at a destination.

18 Claims, 12 Drawing Sheets

Related U.S. Application Data continuation of application No. 13/474,525, filed on May 17, 2012, now Pat. No. 8,908,868.

(51) Int. Cl.
  *H04L 9/32* (2006.01)
  *H04L 9/08* (2006.01)
  *H04L 9/28* (2006.01)
  *H04L 29/12* (2006.01)
  *G06F 21/57* (2013.01)

(56) References Cited

U.S. PATENT DOCUMENTS

| | | |
|---|---|---|
| 6,442,690 B1 | 8/2002 | Howard, Jr. et al. |
| 6,567,914 B1 | 5/2003 | Just et al. |
| 6,892,308 B1 | 5/2005 | Medvinsky |
| 7,174,021 B2 | 2/2007 | Krishnaswamy et al. |
| 7,921,450 B1 * | 4/2011 | Vainstein ............ G06F 21/6209 380/285 |
| 8,144,877 B2 | 3/2012 | Yang et al. |
| 8,245,037 B1 | 8/2012 | Durgin et al. |
| 8,321,925 B1 | 11/2012 | Durgin et al. |
| 8,908,868 B1 | 12/2014 | Baer et al. |
| 8,964,990 B1 | 2/2015 | Baer et al. |
| 2001/0019614 A1 | 9/2001 | Madoukh |
| 2001/0026619 A1 | 10/2001 | Howard, Jr. et al. |
| 2003/0074244 A1 | 4/2003 | Braxton |
| 2005/0091422 A1 | 4/2005 | Minogue et al. |
| 2006/0044610 A1 | 3/2006 | Miyata |
| 2006/0067533 A1 | 3/2006 | Yanovsky |
| 2006/0129565 A1 | 6/2006 | Tamatsu |
| 2006/0242241 A1 | 10/2006 | Tock et al. |
| 2006/0291664 A1 * | 12/2006 | Suarez ................. G06F 21/33 380/286 |
| 2007/0098173 A1 | 5/2007 | Rajakallio |
| 2007/0162820 A1 | 7/2007 | Choi |
| 2007/0198416 A1 | 8/2007 | Ye |
| 2007/0223706 A1 | 9/2007 | Gantman et al. |
| 2007/0226518 A1 | 9/2007 | Yasaki et al. |
| 2008/0031459 A1 | 2/2008 | Voltz et al. |
| 2008/0077710 A1 | 3/2008 | Kouvelas et al. |
| 2008/0126490 A1 | 5/2008 | Ahlenius et al. |
| 2008/0155102 A1 | 6/2008 | Aftelak et al. |
| 2008/0155117 A1 | 6/2008 | Hu et al. |
| 2008/0192940 A1 | 8/2008 | Feng et al. |
| 2008/0288785 A1 | 11/2008 | Rao et al. |
| 2008/0301445 A1 | 12/2008 | Vasic et al. |
| 2009/0259847 A1 | 10/2009 | Li |
| 2010/0115149 A1 | 5/2010 | Ewer |
| 2010/0173610 A1 | 7/2010 | Kitazoe et al. |
| 2010/0241848 A1 | 9/2010 | Smith et al. |
| 2010/0251339 A1 * | 9/2010 | McAlister ............ G06F 21/604 726/4 |
| 2011/0099147 A1 | 4/2011 | Mcalister |
| 2011/0184913 A1 | 7/2011 | Hayden et al. |
| 2011/0191595 A1 | 8/2011 | Damian et al. |
| 2011/0289311 A1 | 11/2011 | Roy-Chowdhury et al. |
| 2011/0295999 A1 | 12/2011 | Ferris et al. |
| 2011/0307937 A1 | 12/2011 | Hildebrand et al. |
| 2013/0044882 A1 | 2/2013 | Rich et al. |

FOREIGN PATENT DOCUMENTS

| | | | | |
|---|---|---|---|---|
| WO | WO-2013006813 A2 * | 1/2013 | ......... | H04N 21/2347 |
| WO | 2013084054 | 6/2013 | | |

OTHER PUBLICATIONS

U.S. Appl. No. 13/474,525, "Non-Final Office Action", dated Aug. 30, 2013, 13 pages.
U.S. Appl. No. 13/474,525, "Non-Final Office Action", dated Mar. 18, 2014, 15 pages.
U.S. Appl. No. 13/474,525, "Notice of Allowance", dated Aug. 21, 2014, 21 pages.
U.S. Appl. No. 14/563,891, "Non-Final Office Action", dated Jul. 15, 2015, 21 pages.
U.S. Appl. No. 14/563,891, "Notice of Allowance", dated Oct. 29, 2015, 24 pages.
Boukerche et al., "The design of a secure key management system for mobile ad hoc networks", Local Computer Networks, 2008. LCN 2008. 33rd IEEE Conference on DOI: 10.11 09/LCN.2008. 4664186, Sep. 2008, pp. 320-327.
Chen et al., "A Rotation Session Key-Based Transposition Cryptosystem Scheme Applied to Mobile Text Chatting", Advanced Information Networking and Applications (AINA), 2014 IEEE 28th International Conference, May 2014, pp. 497-503.

* cited by examiner

KEY ROTATION WITH EXTERNAL WORKFLOWS

CROSS-REFERENCE TO RELATED APPLICATIONS

This application is a continuation of U.S. patent application Ser. No. 14/563,891, filed Dec. 8, 2014, entitled "Key Rotation with External Workflows," and issued to U.S. Pat. No. 9,276,754 on Mar. 1, 2016, which is a continuation of U.S. patent application Ser. No. 13/474,525, filed May 17, 2012, entitled "Key Rotation with External Workflows," and issued to U.S. Pat. No. 8,908,868 on Dec. 9, 2014, which is related to and incorporates by reference for all purposes the full disclosure of co-pending U.S. patent application Ser. No. 13/474,536, filed May 17, 2012, entitled "Automating Key Rotation in a Distributed System," the contents of which are hereby incorporated by reference in their entireties.

BACKGROUND

In many systems, a key must be processed before it can be useful. For example, a public/private keypair must be processed before it can be used in Secure Socket Layer (SSL) or Transport Layer Security (TLS) communications. After a requestor generates the public/private keypair, the requestor then creates a certificate signing request that ties the public portion of the keypair to an identity such that a Certificate authority is satisfied. The Certificate authority, when satisfied with the identity of the requestor, sends back an identity certificate that has been signed by the Certificate authority. The keypair and certificate are then installed on a system to service secure communication for the requestor. After installation, the keypair and certificate are ready for use and may be considered active.

Use of a single key for an extended period may not be advisable, as a key can become compromised. Key rotation and maintenance can allow administrators to reduce risk of system compromise by reducing the time that a compromised key may be actively used. For example, an administration team can choose to rotate a certificate used for communication over SSL. As many different systems are involved, an administration team may manually perform many steps and manually move information from one system to another. Tools, such as a keypair generator, may be used to aid during the key rotation. Once the administration is satisfied that all servers have the new certificate active, the key rotation may be considered completed. However, key rotation can be both a benefit and problem. Key rotation and maintenance can present security issues as manual intervention and internal and external systems may be involved. For example, keypair generation and installation of a certificate with a private key of the keypair requires access to the private key. If an administrative account is accidently compromised, the private key may be viewed and/or accessed. Similarly, mistakes may happen where a private key is improperly stored, generated or transmitted causing exposure of the private key.

BRIEF DESCRIPTION OF THE DRAWINGS

Various embodiments in accordance with the present disclosure will be described with reference to the drawings, in which.

DETAILED DESCRIPTION

Figure 1:
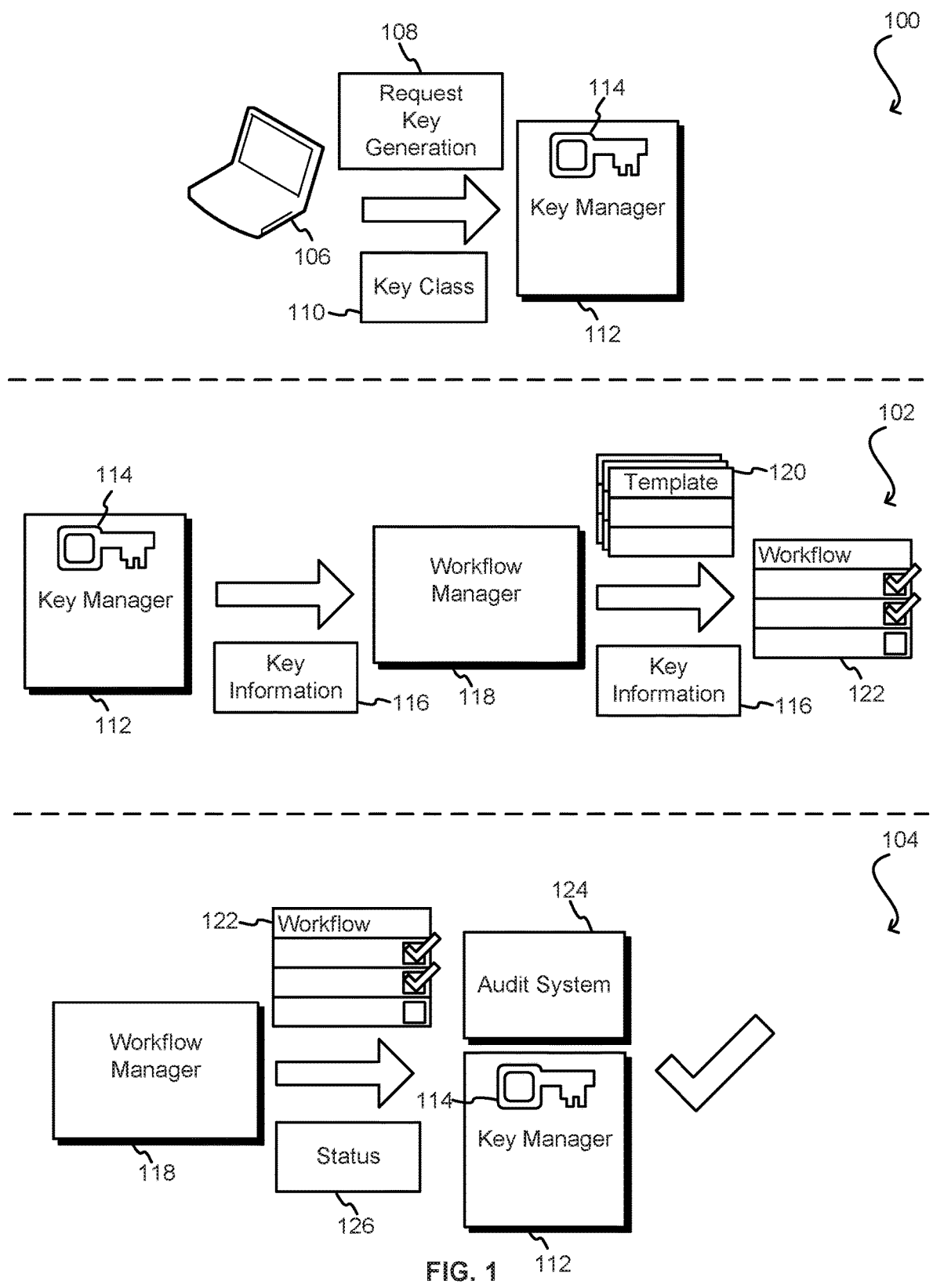
FIG. 1 shows an illustrative example of activating a generated key using an associated workflow in accordance with one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include processing a material set, such as an asymmetric keypair, using an associated workflow to prepare the material set for activation and/or use. In one embodiment, a material set is generated and information about the material set is communicated to a workflow manager. Based at least on the information, the workflow manager generates a workflow that when accomplished will allow the material set to be activated and/or used. Once the workflow is successfully completed, the completion is reported to the key manager. The key manager then marks the material set as activated. An advantage of an automated system that processes such a workflow is that the material set need not be disclosed or accessible to administrators. As the workflow controls the processing of key information, the workflow defines how disclosure of the key information occurs, if it occurs.

In one embodiment, a service provider provides a key manager, workflow manager and destination for the key, such as a load balancer that terminates SSL connections. As the systems are provided by the service provider under the control of the service provider, the service provider may define the interactions between these services in a workflow.

A key can be generated by the key manager, sent through the workflow manager for processing (and potentially communicated to third parties such as a certificate authority, if needed) and installed at a destination because the interaction is defined and/or controlled by the service provider. In some embodiments, this integration is achieved by a program execution service, such as cloud services, in which computing resources and/or virtual computing resources may be provisioned and retired as needs arise.

In one embodiment, key rotation may be defined in a workflow. A key manager may determine a set of servers that require receipt of a key, such as a set of load balancers. The key manager may provide the key and a list of the servers in the set to a key distribution manager. The key distribution manager may distribute the key to the set of servers identified on the list as a non-preferred key. As a non-preferred key, the key may be used if required (such as receipt of an encrypted file that is associated with the non-preferred key), but defaults to a preferred key.

The workflow manager may ensure that each of the set of servers acknowledge receipt of the key or has been excused from acknowledgement by an administrator to complete the distribution of the key. Once the distribution is complete, the key distribution manager may then request that each of the servers having the key make the key a preferred key. As a preferred key, the new key can be used to secure information unless a need arises to use a non-preferred key, if allowed. In some embodiments, a non-preferred key is only allowed to be used during transition periods. The key distribution manager then communicates the success of the key rotation to the key manager which marks the key as active. An advantage of this workflow is that the distribution of a non-preferred key and switch to a preferred key is part of the workflow and does not require knowledge gained outside of the workflow. Another advantage is that manual intervention may not be required if the distribution is successful.

Security policies may also include and/or trigger workflows. For example, a security policy may require a key rotation every 90 days with the workflow to commence 2 weeks before the end of the 90 days. At two weeks before the deadline, the workflow manager attempts to distribute a new key to appropriate servers. If not complete before one week, a warning may issue to the administration. After successful distribution, the workflow manager requests the servers to cause the new key to become the preferred key. The workflow manager can then report to the key manager that the new key is active.

Workflows may also include instructions for handling error conditions. Using the above example, if a workflow manager is unsuccessful in distribution at one week before the end of the 90 days, the workflow manager may send a warning to an administration team for action. The administration team may log on to an administration portal and view the detected problems, such as a set of servers showing up as unavailable. The administration team may then determine if the set of servers should be subject to an exception to the policy, such as the servers should be excepted from the policy because the servers are down for maintenance and will pull the new key upon restart. By integrating a key manager and a workflow manager, an administrative team may focus on fixing exceptions to the workflow.

Keys may include symmetric, asymmetric and fractional keys. For example, an asymmetric key may include a public and private keypair. A symmetric key may include algorithms such as twofish, advanced encryption standard (AES), blowfish, triple data encryption algorithm (3DES) and international data encryption algorithm. Fractional keys may include algorithms that use one or more keys together to cryptographically process data. The keys may be created by a key generator, which may trigger a key distribution system upon key generation.

Turning now to FIG. 1, an illustrative example of activating a generated key using an associated workflow in accordance with one embodiment is shown. Using the system shown in FIG. 1, a key 114 may be taken from initial generation to a useful state based on information about the key 114. The processing of the generated key is shown in three phases: a generation phase 100, a selection phase 102 and a processing phase 104. In generation phase, a client 106 may instruct a key manager 112 to generate and store a material set that may include a key 114 and other information, such as a key class 110. In the embodiment shown, the client 106 sends a request 108 for key generation that identifies a key class 110 to a key manager 112. The key class 110 is associated with a workflow template that may be used to activate a key associated with the key class 110. In some embodiments, characteristics of a key, the proposed end use of a key or the workflow or process for activating a key define a key class. The key manager 112 may generate the key 114 (which may be part of a more comprehensive material set) and store the key 114.

In the selection phase 102, the key manager 112 sends key information 116 to the workflow manager 118 such that a workflow 122 may be generated to process and activate the key 114. In the embodiment shown, the key manager 112 sends key information 116 to the workflow manager. The key information 116 provides enough information about the generated key 114 to allow the workflow manager to select a workflow template 120 and generate a workflow 122 to process the key 114. In some embodiments, the key information may include the key 114 itself. In other embodiments, the key information may describe the key, such as including the key class 110 and a reference to the key.

In the processing phase 104, the workflow manager 118 processes the generated workflow 122 until complete and reports the completion and/or activation to the key manager 112. In the embodiment shown, the workflow manager 118 processes the workflow and updates the key manager 122 and/or audit system 124 with status 126 information related to the key 114 associated with the key information 116. After completion of the workflow 122, the key manager 112 and/or audit system 124 are updated with the status 126 of the completion. The key manager 112 may then mark and/or consider the key as activated.

Figure 2:
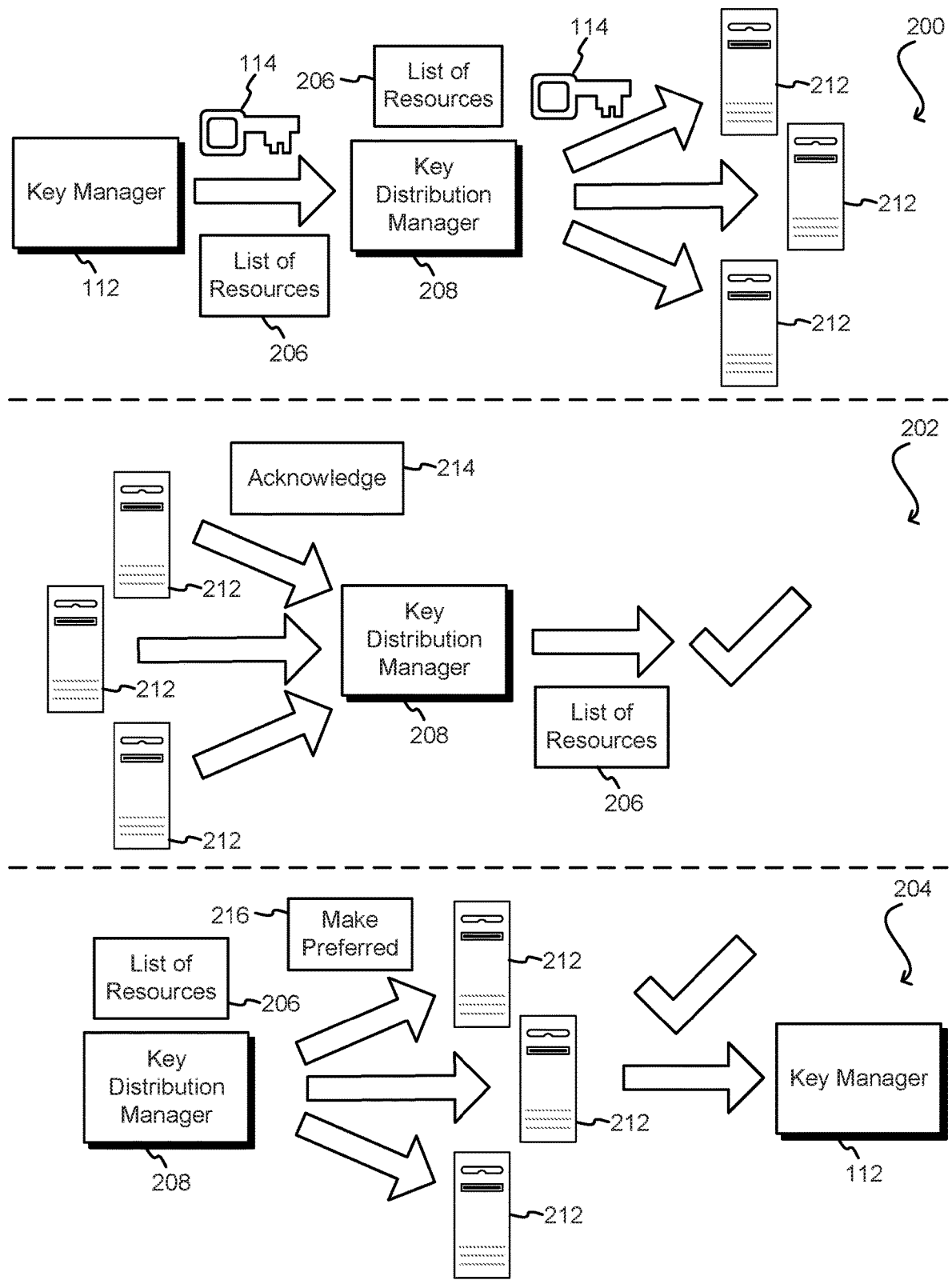
FIG. 2 shows an illustrative example of key rotation in accordance with one embodiment.

Turning now to FIG. 2, an illustrative example of key rotation in accordance with one embodiment in accordance with one embodiment is shown. Upon key generation, a new key 114 can be distributed to a set of computing resources 212 such that the set of computing resources 212 have received the key 114 before the key 114 is fully relied upon. For example, a key may be distributed to a set of storage servers responsible for encryption and decryption of files. The key rotation is described in three phases: distribution 200, acknowledgement 202, and preference 204. During the distribution phase, the key manager 112 shares the key 114 with a key distribution manager 208 to distribute the key 114 to appropriate computing resources 212. In the embodiment shown, a key manager 112 shares a list of resources 206 and a key 114 with a key distribution manager 208. Using the list of resources 210, the key distribution manager 208 distributes the key 114 to the computing resources 212 identified in the list of resources. The key 114 is distributed as a non-preferred key such that a currently preferred key may be continued to be used.

In the acknowledgement phase, the key distribution manager 208 determines which computing resources have received the generated key. After receipt of the key 114, each computing resource 212 sends an acknowledgement 214 to the key distribution manager 208. The acknowledgement may be based in part on the key, such as including a digital signature using the key. The key distribution manager 208 compares the received acknowledgements with the list of resources 206 and upon either receiving an acknowledgement 214 or excusing a computing resource 212 from an acknowledgement 214, the process may move to the next phase. In some cases, not all computing resources 212 will reply with an acknowledgement 214. In some embodiments, the key distribution manager 208 may use error processing in the event of an error. For example, the key distribution manager 208 may include redistribution of the key 114 to computing resources may be attempted until an acknowledgement is received. In other embodiments an administrator may make an exception and/or remove servers from the list of resources 206. In one embodiment, a computing resource monitor may detect the failure of one or more computing resources 212 and grant an exception for the failing computing resource and/or remove the failing computing resource from the list or resources 206.

Once all of the computing resources 212 have responded with an acknowledgement 214, have an exception or have been removed from the list of resources 206, the preference phase 204 may begin. In the preference phase 204, the key distribution manager causes the computing resources 212 to switch the newly acknowledged key 114 from a non-preferred role to a preferred role. In some embodiments, this switch is viewed as moving from an alternate key to a default key. In the embodiment shown in FIG. 2, the key distribution manager 208 sends to the computing resources 212 identified on the list of resources that are not excepted or removed a request 216 to make the acknowledged key a preferred key 114. Upon completion of the switch to a preferred key 114, the key distribution manager 208 and/or computing resources 212 may report success to the key manager 112. In one embodiment, the key distribution manager may be a logical part of the key manager.

In some embodiments, this distribution of a key 114 show in FIG. 2 can be implemented in conjunction with FIG. 1 as a workflow. In other embodiments, the distribution may occur upon generation of a key for rotation such that no template workflow is selected. The system may merely start the process shown in FIG. 2 as a predetermined process.

Figure 3:
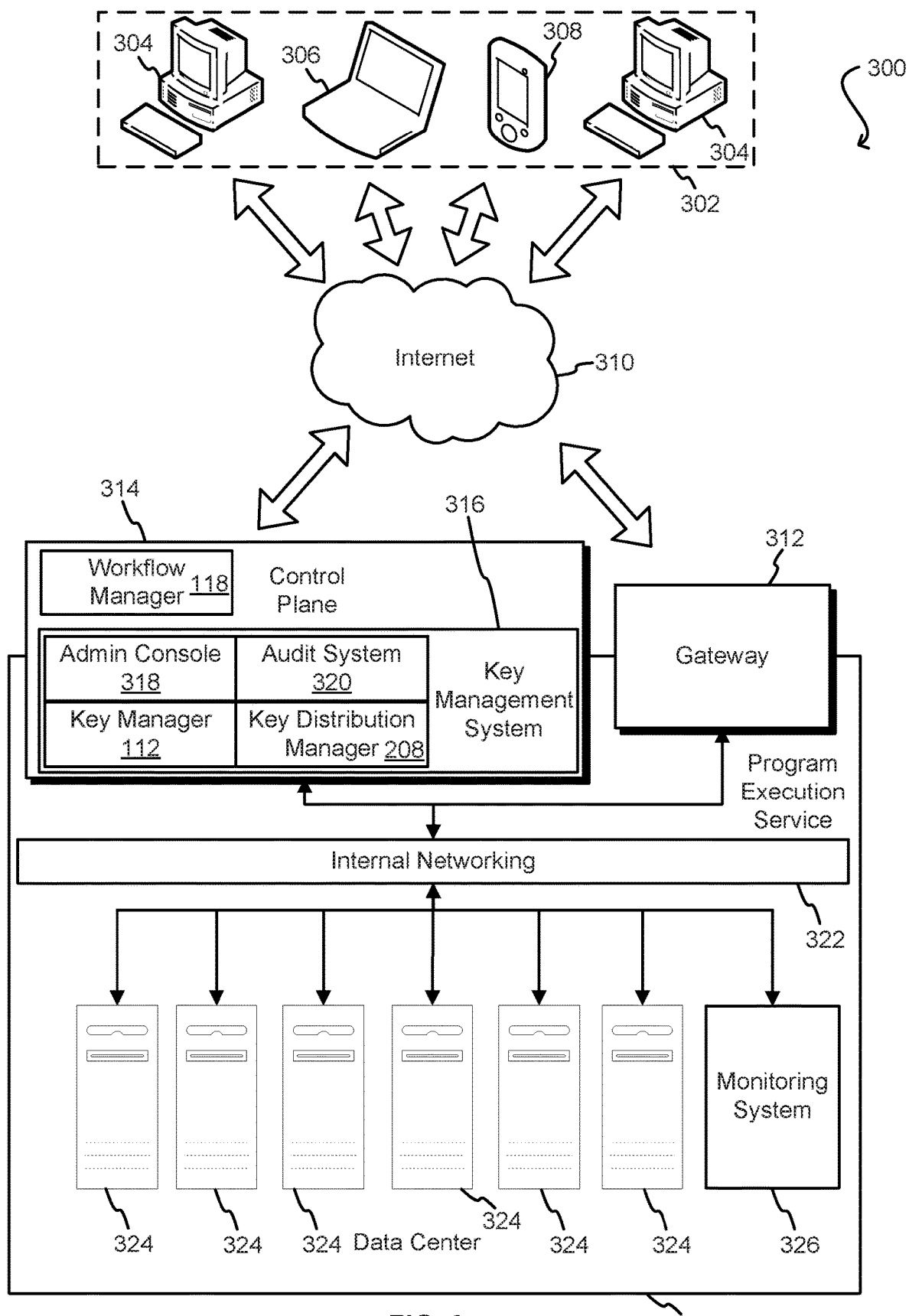
FIG. 3 shows an illustrative example of a key management system in a program execution service environment in accordance with one embodiment.

Turning now to FIG. 3, an illustrative example of a key management system in a program execution service environment 300 in accordance with one embodiment is shown. Computing systems 302, such as desktops 304, laptops 306 and mobile devices 308 may communicate over the Internet 310 with a program execution service 311. Customers of clients managing systems in the program execution service 311 may enter through a gateway 312 in which their communications are then routed through internal networking 322 to client computing resources 324. Clients using computing systems 302 may manage their services by communicating over the Internet 310 with a control plane 314. The control plane 314 may include a workflow manager 118 and a key management system 316. The key management system 316 may further include a key manager 112, key distribution manager 208, administrative console 318 and audit system 320. The key management system 316 may be used to manage distribution, activation and processing of keys within the program execution service 311. For example, the key distribution manager 208 may distribute keys to client computing resources 324, such as virtual machines, upon generation of the key by the key manager 112. A monitoring system 326 may report to the key management system 316 or the workflow manager 118 about problems with the computing resources 324. The audit system 320 may provide details about actions taken and workflow processes completed and/or attempted. In some cases, the audit system may provide warnings via different communication channels such as SMS, email, messaging and/or voice. The administrative console 318 may provide access to administrators to monitor progress and/or manage exceptions to the processing of keys.

By having these systems managed by a program execution service 311, consistent interfaces may be maintained between the various systems. Furthermore, the economies of scale may be useful because programming interfaces between these systems and services may serve many clients that desire to use key rotation. Another advantage is that a private key may never need to leave the internal network 322 of the program execution service 311. Since the private key may not leave the internal network 322, there may not be a need for client access to the private key. In some embodiments, the key management system 316 may complete the rotation, distribution and/or management of private keys without allowing administrative access. As the program execution service 311 and other service provider programs are the only programs with access, the key may be considered more safe. Internal theft, compromised client systems may no longer be a threat because the client may not have access to the keys. In one embodiment, however, the client may bring their own private key and then request the key management system process the private key for use.

The workflow manager 118, key manager 112 and key distribution manager 208 may be collectively implemented by one or more computing resources comprising one or more processors and memory including executable instructions that, when executed by the one or more processors, cause the one or more processors to implement the workflow manager 118, key manager 112 and key distribution manager 208. For example, the workflow manager 118 may be a collection of virtual machines with a managing virtual machine that assigns workflows to be processed by the collection of virtual machines. A key management system 316 may be a collection of virtual machines with a managing virtual machine that implement the key manager 112 and key distribution manager 208 functionality. In another example, the workflow manager 118, key manager 112 and key distribution manager 208 are one or more programs that share a physical machine and operating system. In a further example, the workflow manager 118 may be operated by a third party. The key management system 316 may be operated by a service provider to provide a key manager 112 and key distribution manager 208 functionality. The key management system 316 may distribute key information to the workflow manager 118, such as information that describes the key, but the key itself is not released to a client, the third party or the workflow manager 118.

Figure 4:
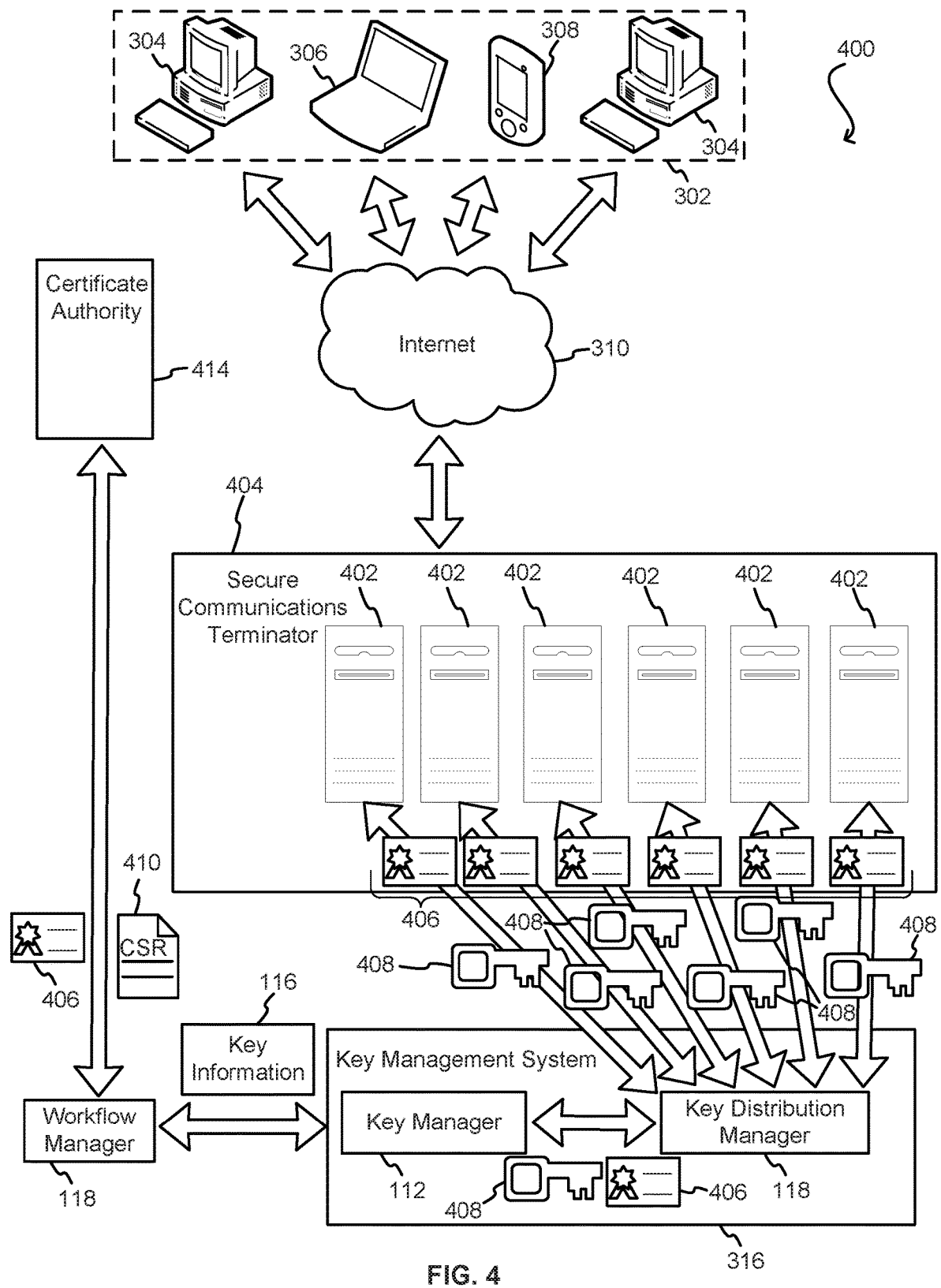
FIG. 4 shows an illustrative example of a key management system used to aid in SSL certificate rotation in accordance with one embodiment.
Figure 5:
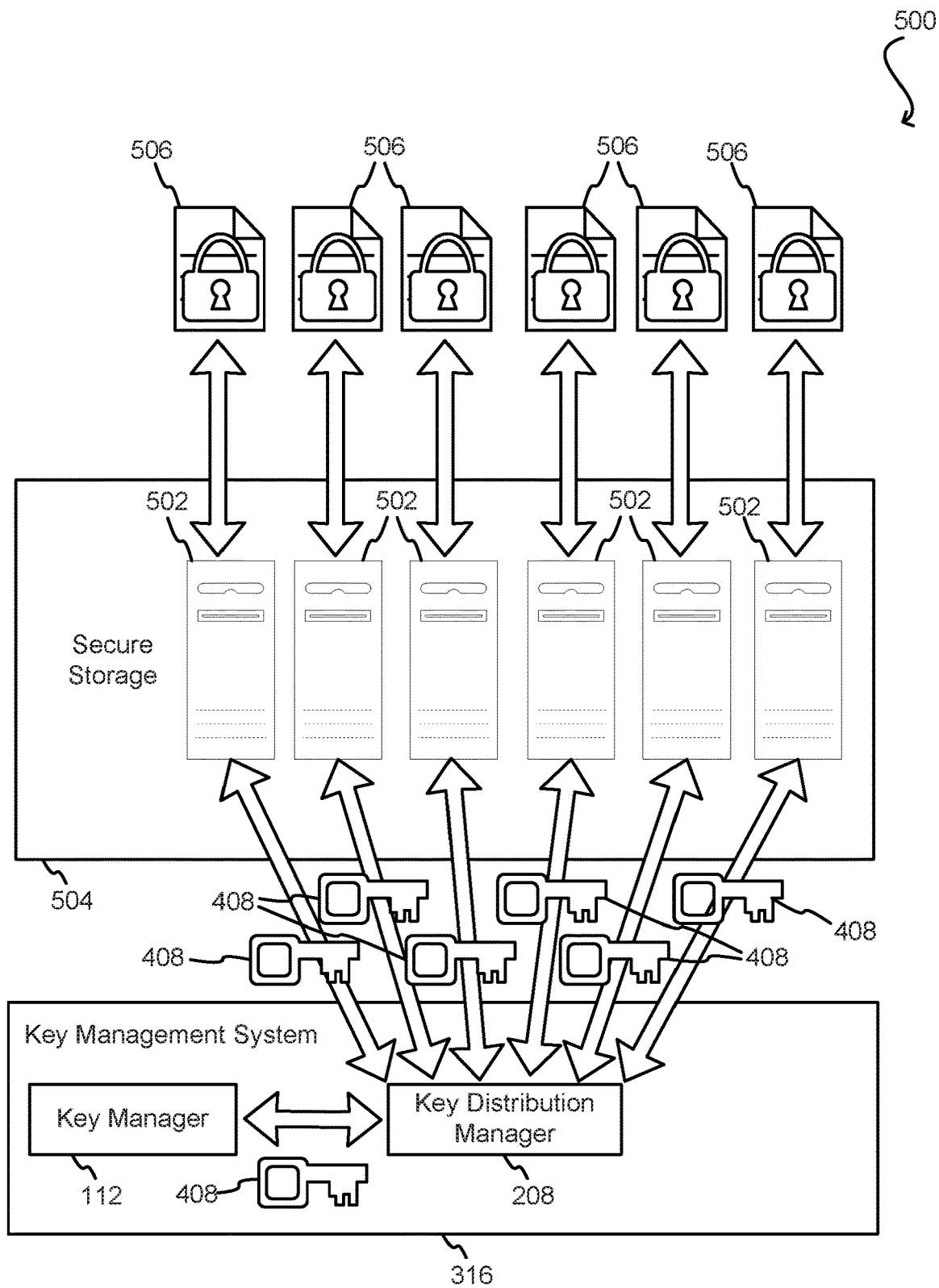
FIG. 5 shows an illustrative example of a key management system used to aid in storage encryption key rotation in accordance with one embodiment.
Figure 6:
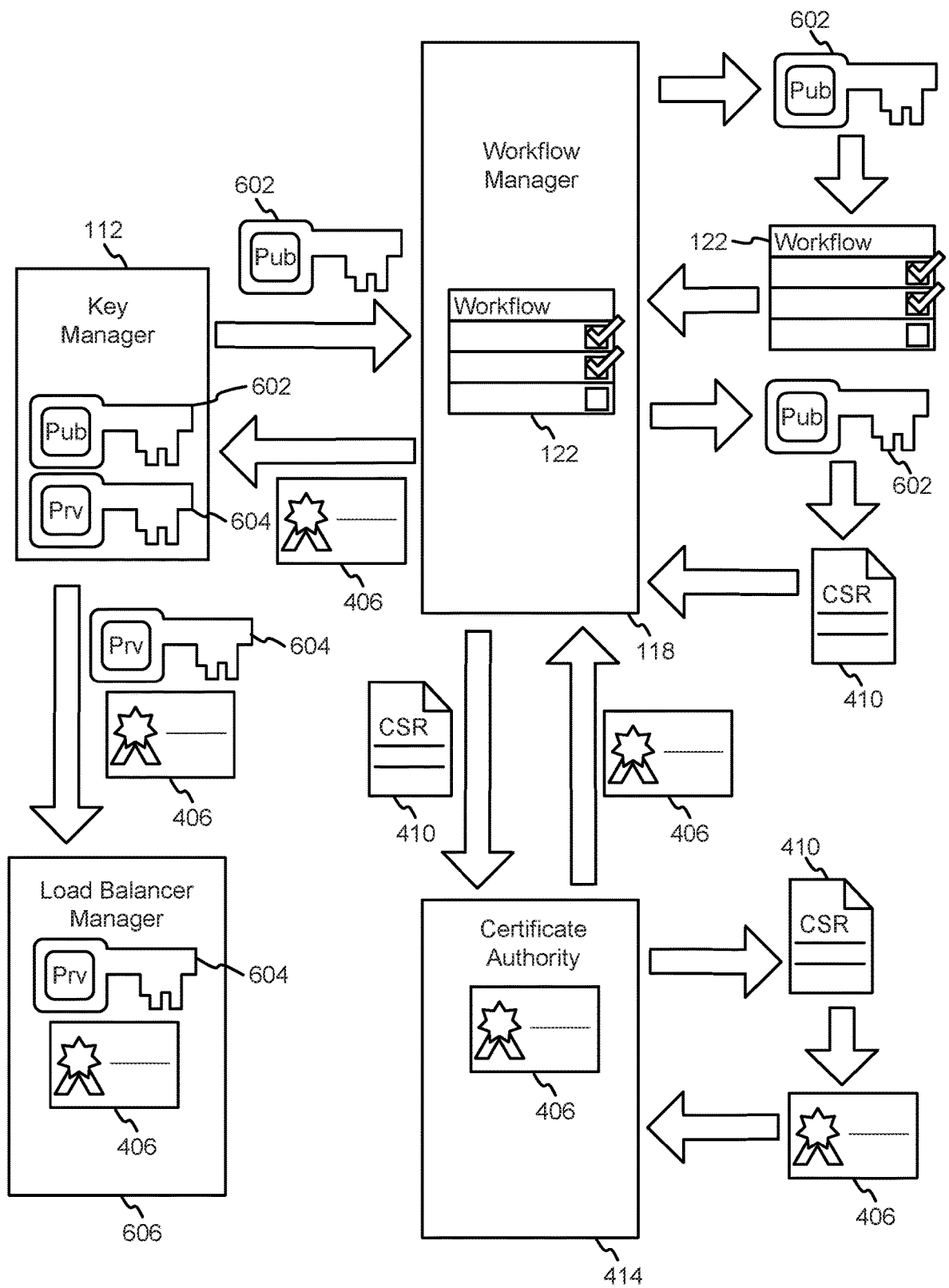
FIG. 6 shows an illustrative example of key management systems and processing during SSL certificate rotation in accordance with one embodiment.

In FIGS. 4-6 illustrative examples of specific embodiments are shown including SSL systems (FIG. 4), secure storage (FIG. 5) and certificate management systems (FIG. 6). Turning now to FIG. 4, an illustrative example of a key management system environment 400 used to aid in SSL certificate rotation in accordance with one embodiment is shown. Using the processes discussed in FIG. 1 and/or FIG. 2, an SSL certificate may be prepared for use with computing resources acting as SSL terminators on behalf of a client. In the embodiment shown, an asymmetric keypair 408 is generated for use in SSL communications. The key manager 112 communicates key information 116 to a workflow manager 118. In one embodiment, the workflow manager 118 selects an SSL processing template from a group of templates (as seen in FIG. 1) and uses the template to generate a workflow 122. In another embodiment, the workflow manager 118 receives the key information 116 and processes the key information 116 the same way without selecting a workflow. Whether a workflow was selected and created or not, the workflow manager 118 creates a certificate signing request 410 (CSR) using the key information 116 and sends the CSR 410 to a certificate authority 414. If the certificate authority 414 is satisfied by the identity of the client behind the CSR 414, the certificate authority 414 returns a signed certificate 406. The workflow manager 118 may return the signed certificate 406 to the key manager 112. The key manager 112 may send at least part of the keypair 408 and certificate 406 to a key distribution manager 118. The key distribution manager 118 may distribute the signed certificate 406 and keypair 408 to computing resources 402 acting as secure communications terminators 404 on behalf of the client. For example the signed certificate 406 and a private key of the keypair 408 may be distributed to a set of load balancers or a load balancer management system that terminate SSL on behalf of the client.

Secure communications may not be the only use for key distribution. For example in FIG. 5, a distributed storage environment 500 using encrypted data may also use key rotation. Storage resources 502 may, for instance, have access to a list of encryption keys used for storage. New incoming data may be encrypted with a preferred key, but outgoing decrypted data may use any key known to the storage resource 502. By loading a rotated key as non-preferred and then switching the key to preferred after verifying receipt of the key, storage resources 506 are not put in a position of being unable to access encrypted data 506 due to lack of a proper key. In FIG. 5, an illustrative example of a key management system 316 used to aid in storage encryption key rotation in accordance with one embodiment is shown. A generated key 408 may be communicated from a key manager 112 to a key distribution manager 208. The key distribution manager 208 may distribute the key 408 as a non-preferred key to storage resources 502 within a secure storage service 504. After receiving an acknowledgement from the storage resources 502 or an exception allowing the workflow manager to continue, the key distribution manager 208 may request the storage resources 502 use the key 408 as the preferred key.

Turning now to FIG. 6, an illustrative example of key management systems and processing during SSL certificate rotation using a workflow in accordance with one embodiment is shown. A key manager 112 generates a public key 602 and private key 604. The public key 602 is shared with a workflow manager 118, which uses the public key 602 to determine a workflow 122 to generate. Following the workflow, the workflow manager 118 uses the public key 602 and private key 604 to create a CSR 410. Following the next operation in the workflow 122, the CSR 410 is sent to a certificate authority 406. The certificate authority 410 uses the CSR 410 to create a certificate 406 and return it to the workflow manager 122. The workflow manager 118, using the workflow 122, then returns the certificate 406 to the key manager 112. As the workflow has been completed, the certificate is marked as active and ready for use. Upon a request by a client to provision a load balancer, the private key 604 and certificate are sent to a load balancer manager 606 by the key manager 112. The load balancer manager 606 may cause the private key 604 and certificate 406 to be installed on a provisioned load balancer with secure communications termination.

Figure 7:
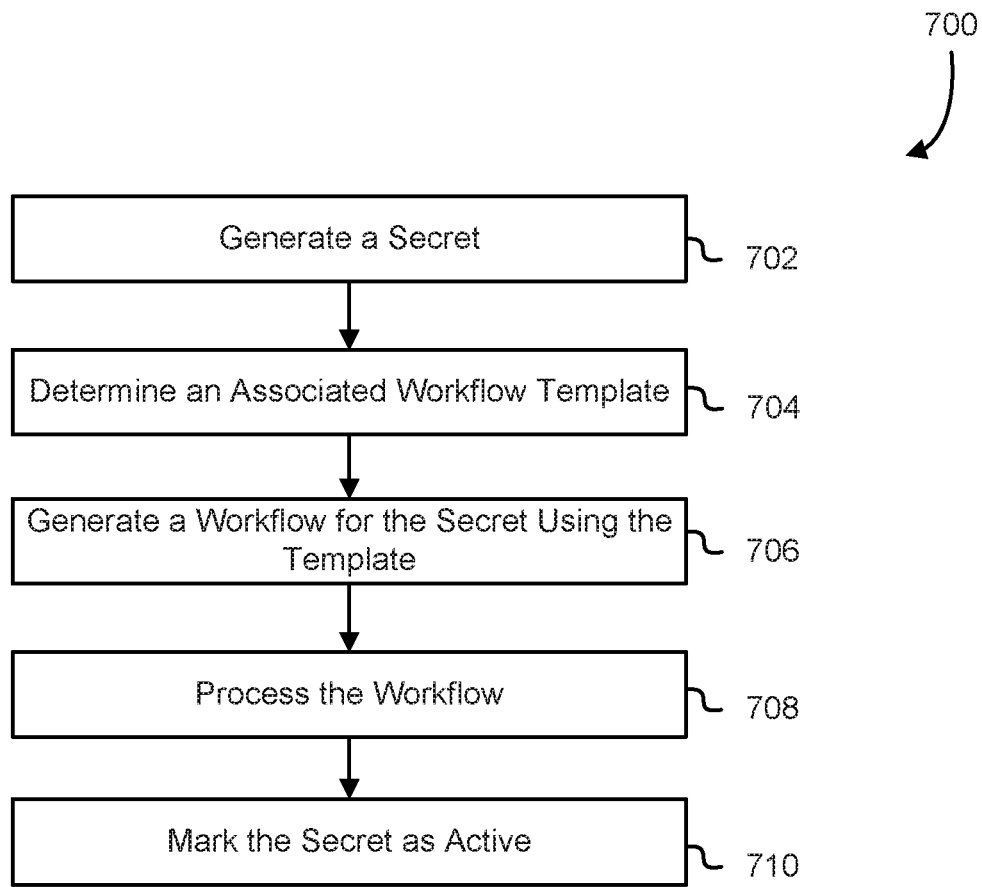
FIG. 7 shows an illustrative example of a process that may be used to activate a generated key using a workflow in accordance with one embodiment.

Turning now to FIG. 7, an illustrative example of a process 700 that may be used to activate a generated key using a workflow in accordance with one embodiment is shown. The process may be accomplished by a key manager 112 and workflow manager 118 as seen in FIG. 1. The key manager 702 generates a secret. A workflow manager receives the secret and determines 704 a workflow template associated with the secret that may be used to prepare the secret for use. Using the template, the workflow manager generates 706 a workflow based at least in part on the selected template. The workflow manager then processes 708 the workflow. Upon completing the workflow, the workflow may report the completion to the key manager in which the secret is marked 710 as active.

Some or all of the process 700 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Figure 8:
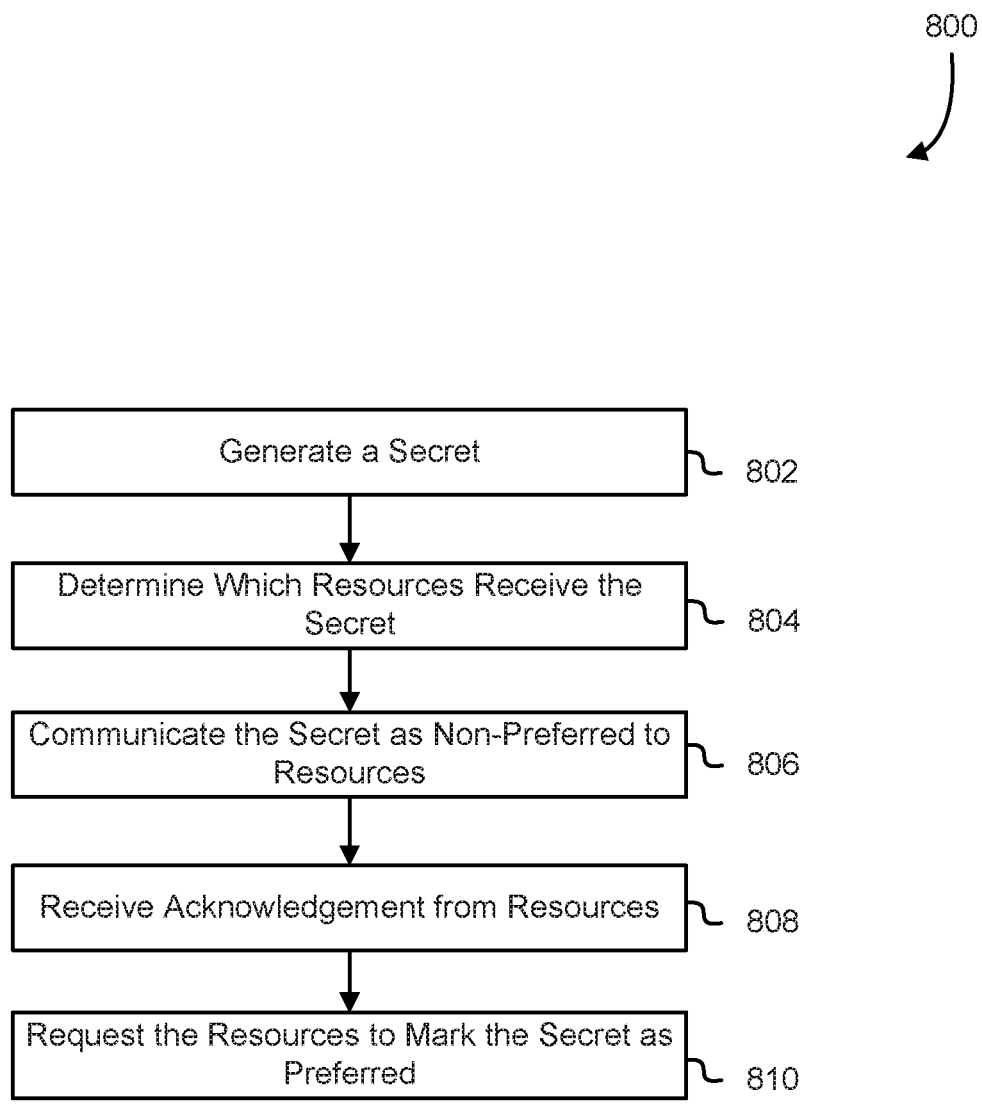
FIG. 8 shows an illustrative example of a process that may be used to distribute a generated key in accordance with one embodiment.

Turning now to FIG. 8, an illustrative example of a process 800 that may be used to distribute a generated key in accordance with one embodiment is shown. The process may be completed by a key manager 112 and key distribution manager 208 shown in FIG. 2. A secret is generated 802. The key manager determines 804 which computing resources should receive the generated secret. The list of resources may be received from a client, determined by a class of secrets, determined through metadata or determined by the key manager based at least in part on the key generated. The key distribution manager 208 communicates 806 the secrets to the computing resources as non-preferred or alternate secrets. The key distribution manager 208 receives an acknowledgement 808 from the computing resources or a computing resource is excepted from acknowledgement. The key distribution manager 208 then requests 810 the computing resources to mark the secret as preferred or default. In some embodiments, the workflow management system 208 then reports the success to the key manager 112 that marks the secret as active.

Figure 9:
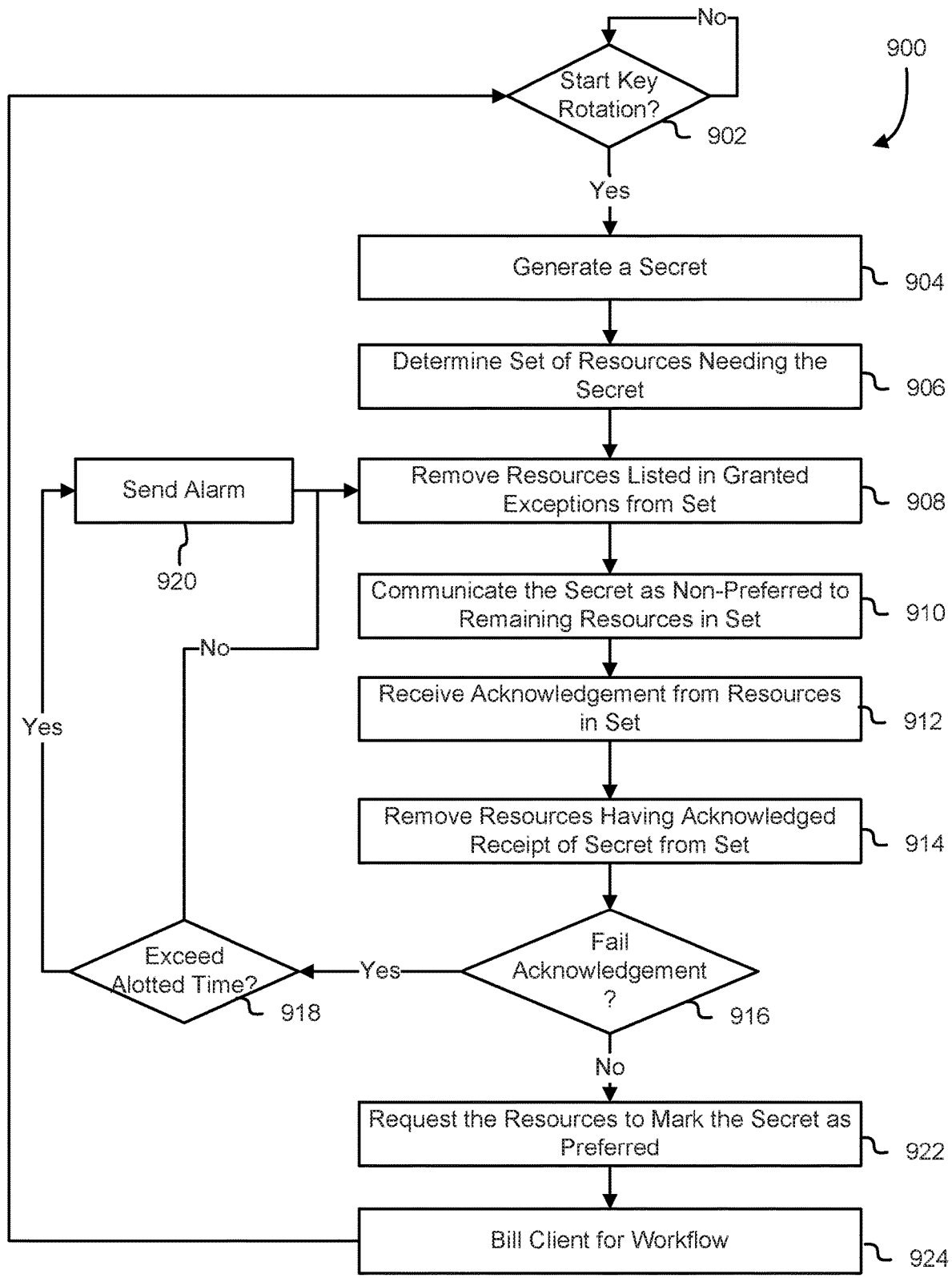
FIG. 9 shows an illustrative example of a process that may be used to rotate a generated key in accordance with one embodiment.

Turning now to FIG. 9, an illustrative example of a process that may be used to rotate a generated key in accordance with one embodiment is shown. In some embodiments, error processing may be included in a workflow and/or processing of a secret. The process may be completed by a key manager 112 and key distribution manager 208 shown in FIG. 2. The key manager 112 and/or key distribution manager 208 check to see if a security policy triggers 902 a start to key rotation. If no, the process may wait and check again 902. If so, the key manager 112 generates 904 a secret. A list of computing resources needing the secret is determined 906 by the key manager. The workflow manager may check for resources that have been granted exceptions and remove 908 any excepted resources from the list of computing resources. The key distribution manager 208 then communicates 910 the secret as a non-preferred secret to the resources remaining as part of the list computing resources. Acknowledgements from computing resources may be received 912. Resources having acknowledged can be removed 914 from the list of computing resources to receive the secret. If not all resources have acknowledged 916, and an initial timeframe for completing the acknowledgement phase has passed 918, an alarm may be communicated 920 to administrators. Whether or not the initial timeframe has passed 918, communication of the key as non-preferred may be reattempted on servers that have not acknowledged the receipt and/or have not been excepted from an acknowledgement by repeating operations 908 to 914. If all acknowledgements have been satisfied or excepted, the key distribution manager 208 requests 922 the computing resources to mark the secret as preferred. The client may then be billed for use of the processing and/or workflow. In some embodiments, a client is charged per machine. In other embodiments, the client may be charged for use of the workflow.

While specific modules and systems have been discussed as having certain functionality for clarity of explanation, it should be recognized that functionality may be moved between modules and/or systems without departing from the scope of this disclosure. For example, while the key manager 112 has been discussed as capable of generating a key, it should be recognized that a key distribution manager 208 may generate or direct to be generated a key. A key distribution manager may also determine a list of computing resources that should receive a key.

In some embodiments, clients, vendors and the service provider may share and/or charge for workflows that generate and process secrets. By selecting a workflow and/or secret from the marketplace, a client may have a secret prepared and installed for use without manual intervention. For example, a client may choose to request SSL through a secure terminator like a load balancer. By selecting an SSL workflow, the client may not need to know about the generation of an asymmetric keypair, certificate signing request or installation of a certificate and private key. The client may select and/or pay for the SSL certificate and request a load balancer be provisioned with SSL termination. Billing may be accomplished by the certificate authority by completion of the workflow rather than upon sending of the certificate. In another example, a client may desire secure storage. The client may select an encryption secret workflow that can be used with long term storage in a program execution service. The encryption secret workflow may complete and store the secret with the program execution service's long term storage service. The client may then store encrypted data within the long term storage.

Figure 10:
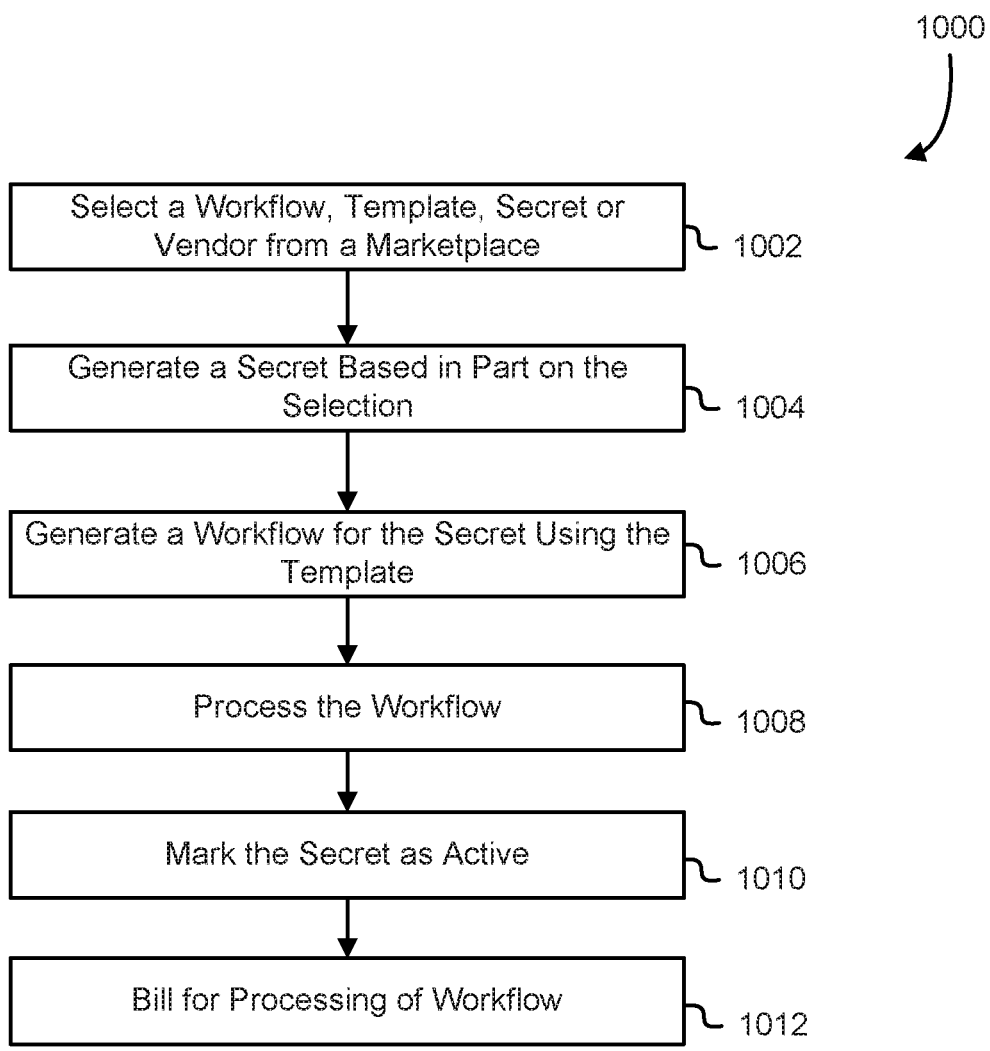
FIG. 10 shows an illustrative example of a process that may be used to activate a generated key using a marketplace in accordance with one embodiment.

Turning now to FIG. 10, an illustrative example of a process 1000 that may be used to activate a generated key using a marketplace in accordance with one embodiment is shown. In some embodiments, secrets and/or workflows may be sold in a marketplace. By purchasing from the marketplace, the secret and workflow are bundled together. For example, a marketplace may allow a client to select a certificate authority from which an SSL certificate may be obtained. The secret and workflow may be prepared by the vendor to quickly integrate with a service provider's systems, such as seen in FIG. 6. In the process shown, a client may select 1002 a workflow, template, secret or vendor from a marketplace. Based on the selection, a secret is generated 1004 by the key manager. A workflow for processing the secret is generated 1006 based at least in part on the generated secret and/or selection. The workflow may then be processed 1008 to make the secret useful. Upon completion of the workflow, the secret may be marked 1010 as active and the client charged 1012 for the processing of the workflow.

Figure 11:
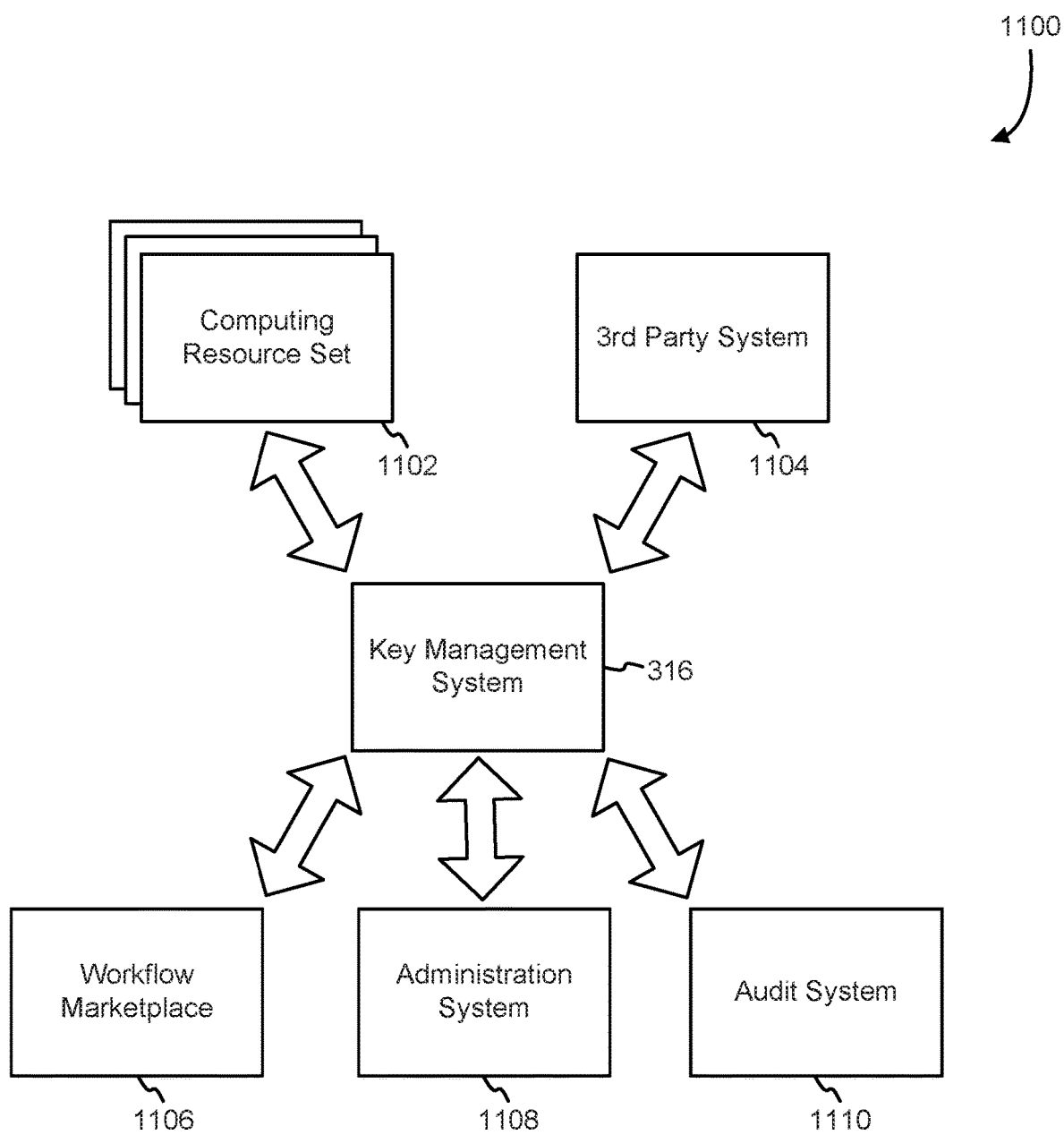
FIG. 11 shows an illustrative example of an environment that may be used to activate a generated key in accordance with one embodiment.

Turning now to FIG. 11, an illustrative example of an environment that may be used to activate a generated key in accordance with one embodiment is shown. A key management system 316 may interact with various support systems, such as those found in a program execution service. The key management system 316 may communicate with a set of computing resources 1102 to not only distribute or rotate keys to client computing resources, but also to request computing resources to process workflows and/or keys. The key management system 316 may also communicate with third party systems 1104, such as certificate authorities to place the generated keys in a useful state. The key management system 316 may also use a workflow marketplace 1106 where clients, vendors and the service provider may sell and submit workflows. The key management system may also tie in with existing administration systems 1108 to provide a single portal and a source of information, such as receiving information about offline servers to remove from the list of servers to receive the key. The key management system may also integrate with existing audit systems 1110 to provide feedback and tracking information for work performed by and on behalf of the key management system.

Figure 12:
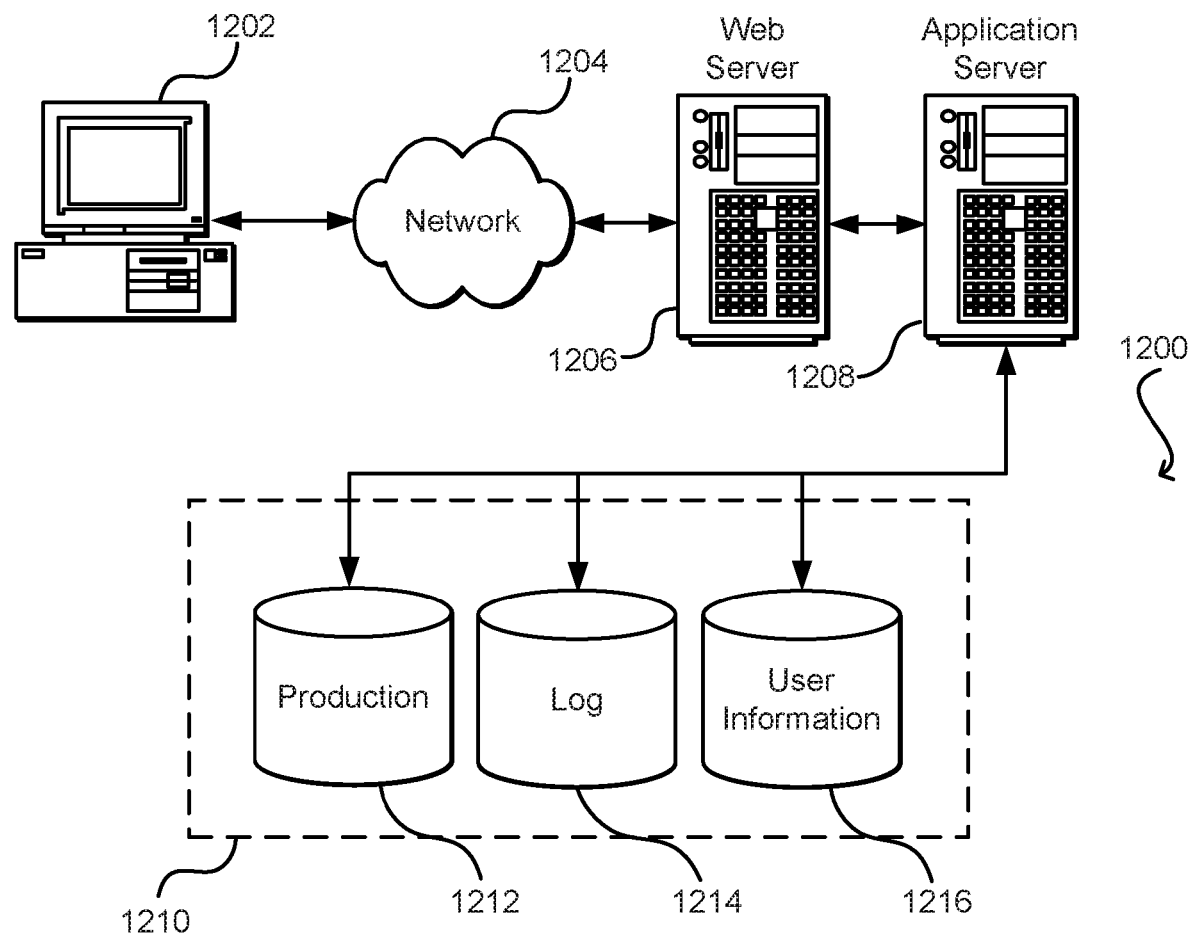
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases, or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle °, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

generating, by a computing system for a client, a keypair for distribution to a computing resource of the computing system over an internal network to the computing system, the computing resource accessible to the client over an external network to the computing system, the keypair unavailable to the client for use on the computing resource until activation of the keypair based at least in part on a workflow; the keypair generated based at least in part on a security policy specifying a time-based rotation of keypairs within the computing system;

selecting, by the computing system, a workflow template for the workflow based at least in part on a class of the keypair, the workflow template defined for the class of the keypair based at least in part on input of an administrator of the computing system, the workflow template specifying actions within the computing system to complete the activation of the keypair based at least in part on the class of the keypair;

performing, by the computing system, the actions within the computing system to complete the workflow;

associating, by the computing system, the keypair with an active status based at least in part on completion of the workflow;

distributing, by the computing system based at least in part on the active status, the keypair to the computing resource over the internal network without sending the keypair to the client, the keypair distributed to the computing resource as a non-preferred keypair, the distributing comprising replacing, for the client, an existing keypair with the keypair based at least in part on the time-based rotation;

receiving, by the computing system from the computing resource, an acknowledgement about receipt of the keypair by the computing resource; and providing, by the computing system to the computing resource and based at least in part on the acknowledgment, instructions about using the keypair for the client as a preferred keypair, the keypair becoming available to the client on the computing resource over the external network based at least in part on the keypair being the preferred keypair.

2. The computer-implemented method of claim 1, wherein the workflow template is further selected based at least in part on an identifier of a certificate authority, wherein the identifier is received from the client, and wherein the actions specified in the workflow template comprises requesting a secure sockets layer (SSL) certificate from the certificate authority.

3. The computer-implemented method of claim 1, wherein the keypair comprises an asymmetric keypair for SSL communications, wherein the actions specified in the workflow template comprise obtaining an SSL certificate based at least in part on a public key of the asymmetric keypair, and wherein activating the keypair comprises distributing a private key of the asymmetric keypair and the SSL certificate to the computing resource.

4. The computer-implemented method of claim 1, wherein the keypair comprises a public key and a private key for secure communications of the client, wherein the actions specified in the workflow template comprise:
  generating a certificate signing request based at least in part on the public key;
  sending the certificate signing request to a certificate authority;
  marking a certificate from the certificate authority as active, the certificate based at least in part on the certificate signing request;
  distributing the certificate and the private key to the computing resource,
  wherein the computing resource utilizes the certificate and the private key for the secure communications.

5. The computer-implemented method of claim 1, wherein the computing resource comprises a storage resource, wherein the keypair comprises an encryption key, wherein the actions specified in the workflow template for the encryption key comprise:
  sending the encryption key to the storage resource as a non-preferred key; and
  instructing the storage resource to start utilizing the encryption key as a preferred key based at least in part on the acknowledgement from the storage resource about receipt of the encryption key, and
  wherein data of the client stored in the storage resource is encrypted with the encryption key based at least in part on the encryption key being the preferred key.

6. The computer-implemented method of claim 1, wherein the keypair is generated based at least in part on a request of the client, wherein the request identifies the class of the keypair, and wherein the class of the keypair comprises at least one of: a characteristic of the keypair or a description of the use of the keypair on the computing resource.

7. The computer-implemented method of claim 1, wherein associating the keypair with the active status comprises marking the keypair as active.

8. A computing system, comprising:
  one or more processors;
  one or more non-transitory computer-readable storage media bearing instructions that, upon execution with the one or more processors, cause the computing system to at least:
    generate, for a client, a secret for distribution within the computing system over an internal network to the computing system, the computing system accessible to the client over an external network to the computing system, the secret unavailable to the client for use until activation of the secret based at least in part on a workflow, the secret generated based at least in part on a security policy, the security policy defining a time-based rotation of secrets based at least in part on input of an administrator of the computing system;
    select a workflow template for the workflow based at least in part on a class of the secret, the workflow template defined for the class of the secret based at least in part on the input of the administrator, the workflow template specifying actions within the computing system to complete the activation of the secret based at least in part on the class of the secret;
    perform the actions within the computing system to complete the workflow;
    associate the secret with an active status based at least in part on completion of the workflow template;
    distribute, based at least in part on the status state, the secret within the computing system over the internal network without sending the secret to the client, the secret distributed as a non-preferred secret; and
    enable the secret to be used in response to an acknowledgement about the secret from a computing resource of the computing system by at least providing instructions to the computing resource about using the secret as a preferred secret, the secret becoming available to the client at the computing system over the external network based at least in part on the secret being the preferred secret.

9. The computing system of claim 8, wherein the secret comprises a key, and wherein the key is generated by a key manager of the computing system, wherein the workflow template is selected by a workflow manager of the computing system based at least in part on receipt of an identifier of the class of the secret from the key manager over the internal network, wherein the actions of the workflow template are performed by a workflow manager of the computing system, and wherein the key is distributed by the key manager to a computing resource of the computing system over the internal network.

10. The computing system of claim 9, the input of the administrator defines interactions between the key manager, the workflow manager, and the computing resource over the internal network to complete the workflow.

11. The computing system of claim 8, wherein the secret is generated based at least on a request of the client for a key, wherein the request identifies the workflow template, and wherein the instructions, upon execution with the one or more processors, further cause the computing system to at least:
  provide a set of workflow templates to the client, the workflow templates associated with respective classes of secrets; and
  receiving the request of the client based at least in part on the set of workflow templates.

12. The computing system of claim 8, wherein the secret is generated based at least in part on a trigger event.

13. The computing system of claim 12, wherein the secret comprises a private key, wherein the trigger event comprises a request of the client associated with secure communications, and wherein the instructions, upon execution with the one or more processors, further cause the computing system to at least:

send the private key and a certificate of the client to a load balancer of the computing system, wherein the load balancer is configured to terminate the secure communications based at least in part on the private key and the certificate.

14. The computing system of claim 8, wherein the instructions, upon execution with the one or more processors, further cause the computing system to at least:
generate a new secret based at least in part on the class of the secret, the new secret unavailable to the client for use within the computing system until processed through a replacement workflow, the replacement workflow replacing the secret with the new secret based at least in part on the class of the secret;
perform the replacement workflow to replace the secret with the new secret;
activate the new secret based at least in part on replacement of the secret with the new secret; and
deactivate the secret based at least in part on the new secret being activated.

15. One or more non-transitory computer-readable storage media having collectively stored thereon executable instructions that, upon execution with one or more processors of a computing system, cause the computing system to at least:
generate, for a client, a key for distribution within the computing system over an internal network to the computing system, the computing system accessible to the client over an external network to the computing system, the key unavailable to the client for use until activation of the key, the key generated based at least in part on a security policy specifying a time-based rotation of keys within the computing system;
select a workflow template to activate the key based at least in part on a class of the key, the workflow template defined for the class of the key based at least in part on input of an administrator of the computing system, the workflow template specifying actions within the computing system to complete the activation of the key based at least in part on the class of the key;
perform the actions within the computing system based at least in part on the workflow template;
associate the key with an active status based at least in part on the actions of the workflow template being performed;
distribute, based at least in part on the active status, the key within the computing system over the internal network without sending the key to the client, the key distributed as a non-preferred key, the distributing comprising replacing, for the client, an existing key with the key based at least in part on the time-based rotation; and
enable the key to be used in response to an acknowledgement about the key from a resource of the computing system by at least providing instructions to the resource about using the key as a preferred key, the key becoming available to the client at the computing system over the external network based at least in part on the key being the preferred key.

16. The one or more non-transitory computer-readable storage media of claim 15, wherein the key is distributed to resources of the computing system, and wherein the actions comprise:
removing the resource from a list of resources based at least in part on the acknowledgment from the resource of receipt of the key;
redistributing the key to another resource on the list based at least in part of a lack of acknowledgment from the other resource of receipt of the key; and
generating an alarm based at least in part on the lack of presented at a portal of the administrator.

17. The one or more non-transitory computer-readable storage media of claim 15, wherein distributing the key comprises replacing an existing key on the resource of the computing system with the key based at least in part on a rotation of keys, and wherein the actions comprise:
determining whether the acknowledgment from the resource of receipt of the key exists;
instructing the resource to activate the key and deactivate the existing key based at least in part on the acknowledgement; and
redistributing the key to the resource based at least in part of a lack of the acknowledgment and generating an alarm based at least in part on the lack of acknowledgement, the alarm presented at a portal of the administrator.

18. The one or more non-transitory computer-readable storage media of claim 15, wherein performing the actions comprises:
performing a webservice call using credentials, the webservice call comprising a public key portion of the key; and
receiving an acknowledgement of receipt of the public key portion of the key.

* * * * *

UNITED STATES PATENT AND TRADEMARK OFFICE
CERTIFICATE OF CORRECTION

PATENT NO. : 10,630,662 B1
APPLICATION NO. : 15/052764
DATED : April 21, 2020
INVENTOR(S) : Baer et al.

Page 1 of 1

It is certified that error appears in the above-identified patent and that said Letters Patent is hereby corrected as shown below:

In the Claims

Column 18, Line 20, Claim 16:
Delete: "at least in part of a lack of acknowledgement from the"
Insert: --at least in part on a lack of acknowledgement from the--

Column 18, Line 23, Claim 16:
Delete: "presented at a portal of the administrator."
Insert: --"acknowledgement, the alarm presented at a portal of the administrator.--

Signed and Sealed this
Twenty-third Day of June, 2020

Andrei Iancu
*Director of the United States Patent and Trademark Office*